United States Patent
Gu et al.

(10) Patent No.: US 11,092,830 B2
(45) Date of Patent: Aug. 17, 2021

(54) LIQUID CRYSTAL DISPLAY AND TERMINAL

(71) Applicant: BEIJING XIAOMI MOBILE SOFTWARE CO., LTD., Beijing (CN)

(72) Inventors: Jianglin Gu, Beijing (CN); Chiafu Yen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/714,696

(22) Filed: Dec. 14, 2019

(65) Prior Publication Data

US 2020/0249512 A1    Aug. 6, 2020

(30) Foreign Application Priority Data

Jan. 31, 2019   (CN) .......................... 201910100715.7

(51) Int. Cl.
*G02F 1/1335* (2006.01)
*G02F 1/133* (2006.01)
(Continued)

(52) U.S. Cl.
CPC ....... *G02F 1/13306* (2013.01); *G02B 6/0021* (2013.01); *G02F 1/133509* (2013.01);
(Continued)

(58) Field of Classification Search
CPC .............. H04M 1/0264; H04M 1/0266; G02F 1/13306; G02F 1/1336; G02F 1/133606;
(Continued)

(56) References Cited

U.S. PATENT DOCUMENTS

2007/0222743 A1*   9/2007   Hirakata .............. G09G 3/3651
                                                                345/102
2008/0002114 A1*   1/2008   Kim .................. G02F 1/133606
                                                                349/113
(Continued)

FOREIGN PATENT DOCUMENTS

| CN | 208384467 U | 1/2019 |
| EP | 3187923 A1 | 7/2017 |
| EP | 3422091 A1 | 1/2019 |

OTHER PUBLICATIONS

CN 208384467 Translation.*
Extended European Search Report of EP Application No. 20151960.0 dated Apr. 9, 2020.

*Primary Examiner* — Thoi V Duong
(74) *Attorney, Agent, or Firm* — Syncoda LLC; Feng Ma

(57) ABSTRACT

A liquid-crystal display includes a backlight layer and a backlight member. The backlight layer is formed with a first light transmitting hole. The backlight member is disposed at the first light transmitting hole, and the backlight member emits light and the light is projected on a region of the liquid-crystal display corresponding to the first light transmitting hole. A display pixel of the region of the liquid-crystal display corresponding to the first light transmitting hole is lower than that of a region of the liquid-crystal display outside the first light transmitting hole. In the region corresponding to the first light transmitting hole, a transparent region exists between adjacent pixels.

20 Claims, 7 Drawing Sheets

(51) Int. Cl.
*F21V 8/00* (2006.01)
*H04M 1/02* (2006.01)
*G02F 1/13357* (2006.01)

(52) U.S. Cl.
CPC .... *G02F 1/133602* (2013.01); *H04M 1/0264* (2013.01); *H04M 1/0266* (2013.01)

(58) Field of Classification Search
CPC ......... G02F 1/133615; G02F 1/133528; G02F 1/1333; G02F 1/13338; G02F 1/133514; G02F 1/13362; G02F 1/133602; G02F 1/133603; G02F 1/133509; G02F 1/133524; G02F 1/133526; G02F 1/33553; G02F 1/1362; G02F 1/1368; G02F 2001/133331; G02F 2001/133314; G02F 2001/133388; G02F 2001/133607; G02F 2201/52; G02F 2201/58; G02F 2201/56; G09F 9/35; G02B 6/0021
See application file for complete search history.

(56) References Cited

U.S. PATENT DOCUMENTS

| | | | |
|---|---|---|---|
| 2010/0232137 A1* | 9/2010 | Liao | G02B 5/0278 362/97.1 |
| 2020/0117034 A1* | 4/2020 | Yin | G02F 1/1339 |
| 2020/0174307 A1* | 6/2020 | Chang | G02F 1/133512 |

* cited by examiner

LIQUID CRYSTAL DISPLAY AND TERMINAL

CROSS-REFERENCE TO RELATED APPLICATION

The present application claims priority to Chinese Patent Application 201910100715.7, filed on Jan. 31, 2019, the disclosure of which is hereby incorporated by reference in its entirety.

BACKGROUND

In recent years, a full screen has become a new trend in the development of smart phones. The smart phones usually have components such as a front camera adapted to the full screen.

SUMMARY

The present disclosure relates generally to the fields of terminal technologies, and more specifically to a liquid-crystal display (LCD) and a terminal.

According to a first aspect, an embodiment of the present disclosure provides a liquid-crystal display, wherein the liquid-crystal display includes:

a backlight layer, formed with a first light transmitting hole;

a backlight member, disposed at the first light transmitting hole, wherein the backlight member emits light and the light is projected on a region of the liquid-crystal display corresponding to the first light transmitting hole, wherein a pixel density of the region of the liquid-crystal display corresponding to the first light transmitting hole is lower than that of a region of the liquid-crystal display outside the first light transmitting hole.

In some embodiments, in the region corresponding to the first light transmitting hole, a transparent region exists between adjacent pixels.

In some embodiments, the backlight member includes:

a light emitting element, and a light gathering member located on a light emitting side of the light emitting element, wherein the light gathering member is disposed to uniformly project light emitted by the light emitting element onto the liquid-crystal display and to correspond to the first light transmitting hole.

In some embodiments, the backlight member further includes: a light guide member disposed between the light emitting element and the light gathering member.

In some embodiments, a density of driving elements of a region of an array substrate of the liquid-crystal display corresponding to the first light transmitting hole is lower than a density of driving elements of a region of the array substrate outside the light transmitting hole; and/or a density of filters of a region of a filter layer of the liquid-crystal display corresponding to the first light transmitting hole is lower than a density of filters of a region of the filter layer outside the light transmitting hole.

In some embodiments, the liquid-crystal display further includes a liquid crystal driving circuit;

a liquid crystal layer in the liquid-crystal display including a light transmitting state caused by control of the liquid crystal driving circuit.

In some embodiments, the liquid crystal layer further includes a light shielding state caused by control of the liquid crystal driving circuit, and a light transmittance under the light shielding state is smaller than a light transmittance under the light transmitting state.

In some embodiments, an array substrate of the liquid-crystal display includes transparent wirings disposed corresponding to a transparent region; and/or a filter layer of the liquid-crystal display includes a transparent portion disposed corresponding to the transparent region.

In some embodiments, the liquid crystal layer includes a transparent barrier, the transparent barrier separates liquid crystals in the liquid crystal layer corresponding to the first light transmitting hole and liquid crystals in the liquid crystal layer outside the light transmitting hole.

In some embodiments, an inner polarizing layer of the liquid-crystal display is formed with a second light transmitting hole corresponding to the first light transmitting hole.

In some embodiments, the backlight member further includes an auxiliary polarizing layer located on a light emitting side of the light emitting element, wherein the auxiliary polarizing layer is disposed in a second light transmitting hole, and the second light transmitting hole is a light transmitting hole corresponding to the first light transmitting hole and disposed in an inner polarizing layer of the liquid-crystal display; or the auxiliary polarizing layer is disposed on a side of the light gathering member away from the light emitting element; or the auxiliary polarizing layer is disposed on a side of the light gathering member facing the light emitting element.

In some embodiments, the liquid-crystal display further includes a backlight driving circuit, and the backlight driving circuit drives the backlight member to be turned on or off.

In some embodiments, the backlight member is selected from at least one of: a mini light emitting diode element or element array, a micro light emitting diode, a micro light emitting diode element or element array, a liquid-crystal display, and an organic light emitting diode element or element array.

In some embodiments, the light gathering member is selected from at least one of: a prism, a microlens array, and a lens array.

In some embodiments, the backlight member is located in a surrounding region of the first light transmitting hole below the backlight layer; or the backlight member is located within the first light transmitting hole.

According to a second aspect, an embodiment of the present disclosure provides a display method, applied to the liquid-crystal display provided by the above first aspect, the method including:

the backlight layer emitting light, the light being displayed on a region of the liquid-crystal display outside the first light transmitting hole;

the backlight member emitting light, the light being projected on the liquid-crystal display and corresponding to the first light transmitting hole, and displayed on a region of the liquid-crystal display corresponding to the first light transmitting hole.

In some embodiments, the backlight member emitting light includes:

the light emitting element emitting light, and a liquid crystal driving circuit driving liquid crystals of a liquid crystal layer at the first light transmitting hole to be turned to a light transmitting state, and changing a polarization angle of the light emitted by the backlight member, such that the light penetrates an outer polarizing layer to achieve screen display.

In some embodiments, the method further includes:

the liquid crystal driving circuit of the liquid-crystal display communicating with a backlight driving circuit of the backlight member, a display content of a region of the liquid-crystal display outside the first light transmitting hole and a display content of a region of the liquid-crystal display corresponding to the first light transmitting hole synchronize.

In some embodiments, the method further includes:

the backlight layer emitting light, the light being displayed on the region of the liquid-crystal display outside the first light transmitting hole;

turning off the backlight member, the liquid crystal driving circuit driving liquid crystals of a transparent region corresponding to the first light transmitting hole to be turned to a light transmitting state to realize light collection; or the liquid crystal driving circuit driving liquid crystals corresponding to the first light transmitting hole to be turned to a light transmitting state to realize light collection.

In some embodiments, the method further includes:

turning off the backlight layer and the backlight member, and the liquid crystal driving circuit driving liquid crystals corresponding to the first light transmitting hole to be turned to a light shielding state to realize screen off.

According to a third aspect, an embodiment of the present disclosure provides a terminal, including: a lens, and the liquid-crystal display provided by the above first aspect, wherein the lens is disposed corresponding to a first light transmitting hole in the liquid-crystal display, and the backlight member is disposed in a surrounding region of the lens.

In some embodiments, the backlight member is disposed around the lens; or the backlight member is disposed on one side of the lens; or the backlight member is formed with a hollow region corresponding to the first light transmitting hole, and the lens is inserted into the hollow region.

It should be understood that the above general description and the following detailed description are exemplary and explanatory, and should not limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of some embodiments of the present disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of devices and methods consistent with aspects related to the disclosure as recited in the appended claims.

The inventors of the present disclosure have recognized that one of difficulties in technologies for achieving the full screen in a true sense is the fact that a photographing function and a full screen display function cannot be realized at the same time. Various embodiments of the present disclosure can address these above technical problems, as for a mobile phone using a Liquid-Crystal Display (LCD) as a screen, a camera can be disposed beneath the liquid-crystal display in order to realize the full screen.

However, in order to dispose the camera beneath the liquid-crystal display, a hole needs to be opened in the liquid-crystal display and then the camera is placed in the hole. Although the camera can capture an image in front of the mobile phone through the hole, no display function can be realized at the hole. Therefore, no image can be displayed at a position corresponding to the hole when an image is displayed on the liquid-crystal display, so the overall full screen display effect cannot be achieved. On the other hand, in order to achieve the full screen display effect, some technical solutions are provided to change a front photographing portion into a pop-up structure by a hardware structure or to adopt some other manners, but sacrifices will have to be made no matter in costs or production processes and user experience.

Based on the above problems, various embodiments of the present disclosure provide a liquid-crystal display, a display method and a terminal.

Figure 1:
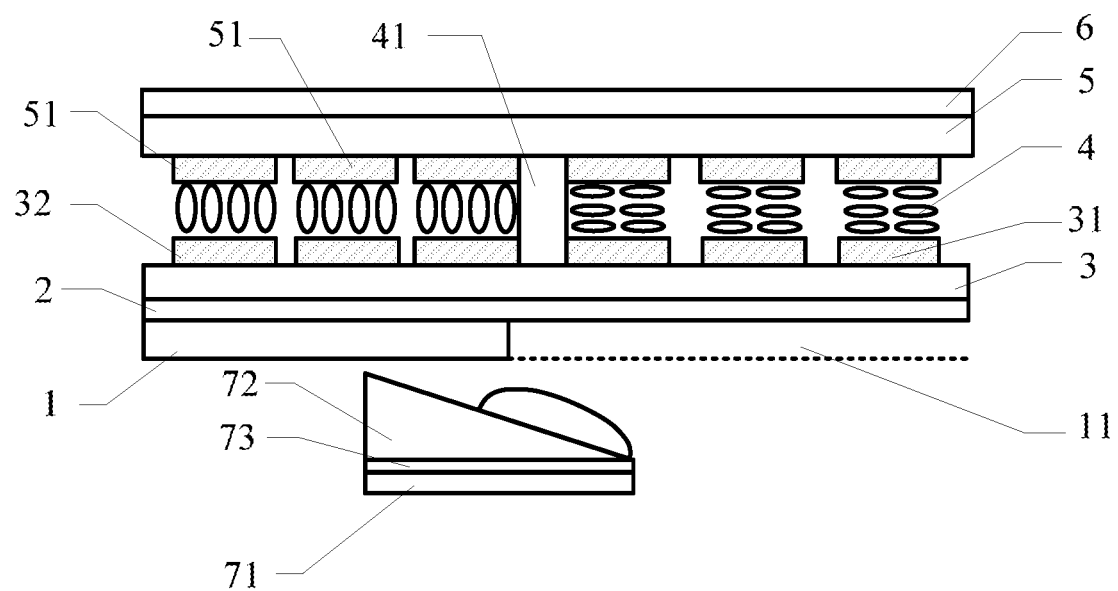
FIG. 1 is a structural schematic diagram illustrating a liquid-crystal display according to an exemplary embodiment.

According to a first aspect, an embodiment of the present disclosure provides a liquid-crystal display. As shown in FIG. 1, the liquid-crystal display includes: a backlight layer 1, an inner polarizing layer 2, an array substrate 3, a liquid crystal layer 4, a filter layer 5, and an outer polarizing layer 6 which are sequentially disposed.

When the liquid-crystal display is in operation, the backlight layer 1 emits light to provide a light source for the liquid-crystal display, and the backlight layer 1 usually emits white light.

The inner polarizing layer 2 allows light having a polarization angle emitted from the backlight layer 1 to pass through.

The array substrate 3 includes a driving element 31 for driving the rotation of liquid crystals in the liquid crystal layer 4 to further change the polarization angle of the light passing through. Under driving of the driving elements in the array substrate 3, the liquid crystal in the liquid crystal layer 4 has two states, i.e., a light transmitting state and a light shielding state. In the embodiment, the light transmittance of the liquid crystal layer 4 in the light shielding state is lower than that of the liquid crystal layer 4 in the light transmitting state.

The filter layer 5 includes a color filter 51. The filter layer 5 generally includes red, green and blue filters, which helps to realize the color display effect of the liquid-crystal display.

A polarization direction of the outer polarizing layer 6 is different from that of the inner polarizing layer 2, and they are generally perpendicular to each other. According to this, light having a polarization angle the same as a polarization direction of the outer polarizing layer 6 after it passes through the liquid crystal layer 4 can be emitted from the liquid-crystal display. It can be understood that an intensity of light emitted from the liquid-crystal display can be changed by the liquid crystal layer 4, so that the liquid-crystal display has a display effect of brightness and darkness, and an image display function is realized by the color filtering of the filter layer 5.

It should be further noted that, in the liquid-crystal display, a region corresponding to an adjacent group of filters (including red, green, and blue filters) in the filter layer is generally referred to as a pixel unit. When an image is displayed, one pixel unit forms one pixel point. By presenting a preset display state, including a preset color and a preset brightness or the like, through different pixel points, the image display function of the liquid-crystal display is realized.

In an embodiment of the present disclosure, the backlight layer 1 is formed with a first light transmitting hole 11. The first light transmitting hole 11 is a region that does not emit light and allows light to pass through.

For example, the first light transmitting hole 11 is a through hole on the backlight layer 1. Alternatively, the first light transmitting hole 11 is formed of a nonluminous transparent material in a preset region of the backlight layer 1. Alternatively, the first light transmitting hole 11 is a blind hole, and a portion on the backlight layer 1 corresponding to the first light transmitting hole 11 is made of a transparent material.

For example, the backlight layer 1 includes one or more first light transmitting holes 11. Moreover, a size and a shape of the first light transmitting hole 11 are not limited. In use, In some embodiments, one of the first light transmitting holes 11 corresponds to a plurality of external elements, such as lenses or the like.

The liquid-crystal display further includes a backlight member 7 disposed at the first light transmitting hole 11. Light of the backlight member 7 is projected on the liquid-crystal display and corresponds to the first light transmitting hole 11. It can be understood that the backlight member 7 provides a backlight for the first light transmitting hole 11, and the image display of the liquid-crystal display corresponding to first light transmitting hole 11 is realized by the function of the inner polarizing layer 2, the array substrate 3, the liquid crystal layer 4 and the outer polarizing layer 5.

In an embodiment, as shown in FIG. 1, the backlight member 7 includes a light emitting element 71 and a light gathering member 72. The light gathering member 72 is disposed on a light-emitting surface of the light emitting element 71, to allow light emitted from the light emitting element 71 to be uniformly projected on the liquid-crystal display and corresponding to first light transmitting hole 11.

For example, the backlight member 7 is selected from at least one of a mini Light-Emitting Diode (LED), a mini LED array, a Micro Light Emitting Diode (Micro LED), a Micro LED array, a liquid-crystal display and an Organic Light-Emitting Diode (OLED) array. Also, the backlight member 7 optionally has a flat light-emitting surface or a curved light-emitting surface, or the like.

For example, the light gathering member 72 can optionally be a prism, a microlens array, a lens array or a combination thereof. Of course, the light gathering member 72 can be modifications on a prism, a microlens, a microlens array, a lens array, which is not limited herein, as long as the light may be uniformly displayed on a region of the display screen corresponding to the first light transmitting hole. A shape of the light gathering member 72 is not limited, for example, the light gathering member 72 has a curved or inclined light incident surface and/or light-exiting surface, such that light emitted from light emitting elements at different positions of the backlight member 7 is uniformly distributed in the first light transmitting hole 11 of the liquid-crystal display, and the display effect of the first light transmitting hole 11 is optimized.

Further, the backlight member 7 further includes a light guide member 73 disposed between the light emitting element 71 and the light gathering member 72. The light emitted by the light emitting element 71 is scattered by the light guide member 73 to form a uniform luminous surface light source, thereby ensuring the display effect of the liquid-crystal display.

The liquid-crystal display provided by the embodiment of the present disclosure provides a backlight source for the region of the liquid-crystal display outside the first light transmitting hole through the backlight layer 1, to realize image display; and provides a backlight source for the region of the liquid-crystal display corresponding to the first light transmitting hole through the backlight member 7, to realize image display. Therefore, the liquid-crystal display exhibits a full screen display effect while maintaining the structural integrity.

Figure 2:
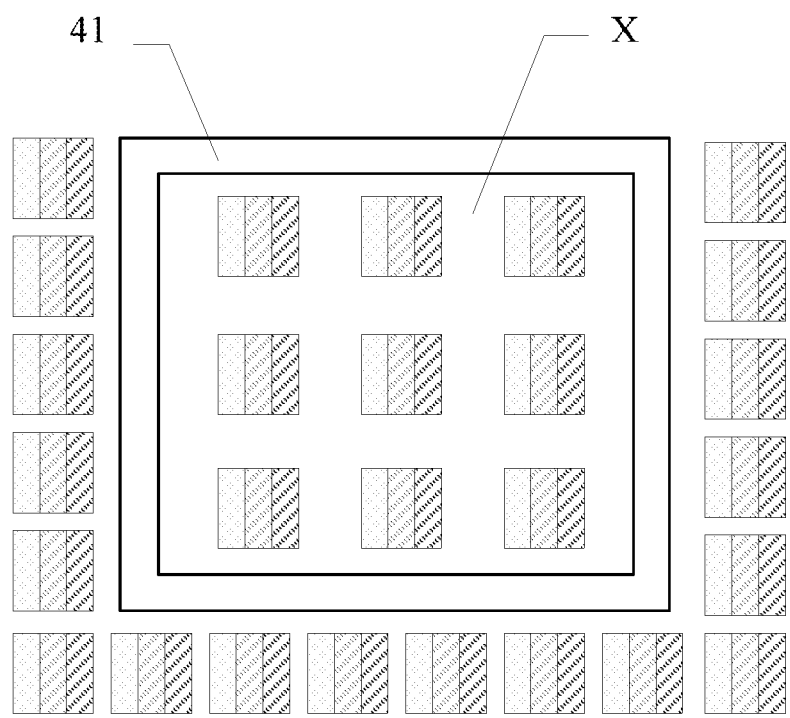
FIG. 2 is a partial structural schematic view of a liquid-crystal display according to some embodiments.

Moreover, in conjunction with FIG. 2, the pixel density of the region in the liquid-crystal display corresponding to the first light transmitting hole 11 is lower than the pixel density of the region outside the first light transmitting hole 11. In other words, the density of the pixel unit of the region in the liquid-crystal display corresponding to the first light transmitting hole 11 is lower than the density of the pixel unit of the region in the liquid-crystal display outside the first light transmitting hole 11, so as to facilitate image acquisition function of the camera under the screen. The technical solution according to some embodiments of the present application can cooperate with the backlight independent miniLED at the same time, thereby realizing the camera function under the screen and the full screen display function.

In such a case, the backlight member 7 has following various alternative display modes.

The first mode: the backlight member 7 is controlled to emit light to display a preset image at a region of the liquid-crystal display corresponding to first light transmitting hole 11. The preset image can be an image set in advance, for example, a pattern of a single color, or a preset pattern such as a terminal brand icon, a power icon, a Bluetooth icon, an icon of an application, or a pattern directly defined by the user.

The second mode: a display image at the first light transmitting hole 11 is determined according to a display image of a portion around the first light transmitting hole 11 of the liquid-crystal display.

For example, display parameters of an image around the first light transmitting hole 11 are obtained. The display parameters include, but not limited to, at least one of a brightness parameter or a color parameter. The backlight member 7 is controlled to emit light according to the obtained display parameters, so that the image displayed at the first light transmitting hole 11 and the image displayed around the first light transmitting hole 11 are formed almost as a whole.

For example, if there is an app interface in a current screen display interface, the first light transmitting hole 11 is surrounded by a pink background interface, and in the second mode, pink and a brightness parameter value of the background interface can be obtained and a light emitting element is controlled according to the pink and the brightness parameter value to realize screen display at the first light transmitting hole 11, therefore a more coherent display effect is achieved.

The third mode: the backlight member 7 is controlled to emit light according to a display content at the first light transmitting hole 11 of the liquid-crystal display.

For example, if the first light transmitting hole 11 is located in a region in which time is displayed in the liquid-crystal display, a content to be displayed at the first light transmitting hole 11 such as "17:15" can be obtained and the backlight member 7 is controlled to emit light according to the content to be displayed, i.e., the display image "17:15". Of course, the content displayed at the first light transmitting hole 11 can also be part of a complete image, for example, the complete image is "17:15" and the content to be displayed is ":15".

It should be noted that, since the pixel at a region of the liquid-crystal display corresponding to the first light transmitting hole 11 is lower than the pixel at a region of the liquid-crystal display outside the first light transmitting hole 11, optionally, the image having less dynamic change, for example, mobile phone brand icons, app application icons, power icons, signal icons and the like, may be displayed at the first light transmitting hole 11.

In one embodiment, the pixel at a region of the liquid-crystal display corresponding to the first light transmitting hole 11 being lower than the pixel at a region of the liquid-crystal display outside the first light transmitting hole 11 has following specific implementation.

A density of driving elements 31 of a region of the array substrate 3 corresponding to the first light transmitting hole 11 is lower than a density of driving elements 31 of a region of the array substrate 3 outside the first light transmitting hole 11.

A density of filters 51 of a region of the filter layer 4 corresponding to the first light transmitting hole 11 is lower than a density of filters 51 of a region of the filter layer 4 outside the light transmitting hole. More specifically, in the filter layer 4, the density of the filters refers to the density of the filter layer group (including the red filter, the blue filter, and the green filter).

Further, in a region of the liquid-crystal display corresponding to the first light transmitting hole 11, a light transmitting region X exists between adjacent pixels. The light may penetrate the liquid-crystal display from the light transmitting region X.

In this case, when the liquid-crystal display is matched with the lens, the lens is disposed corresponding to the first light transmitting hole 11, and the light outside the liquid-crystal display may enter the lens from the light transmitting region X, thereby realizing the image acquisition function of the lens. Moreover, through the setting of the light transmitting region X and the low pixel density, the light transmittance of the liquid-crystal display is effectively enhanced, so that more light may be received by the lens, the brightness of the image captured by the lens is improved, and the image acquisition effect is optimized. As a preferred embodiment, the light transmitting region X is colorless and transparent, which sufficiently improves the light transmittance and improves the image acquisition effect of the lens under the screen.

In one embodiment, an array substrate 3 of the liquid-crystal display includes transparent wirings disposed corresponding to the transparent region X, such as indium tin oxide wirings. The filter layer 4 of the liquid-crystal display includes a transparent portion provided corresponding to the transparent region X. In some embodiments, colored filters are discretely disposed, such that a region between the colored filters forms a transparent portion. Alternatively, the transparent portion is optionally formed by using a colorless filter. Based on any one of the above, the transparency of the transparent region X may be ensured, the obstruction to the light penetration may be weakened, and the light transmittance of the transparent region X may be effectively improved.

Figure 3:
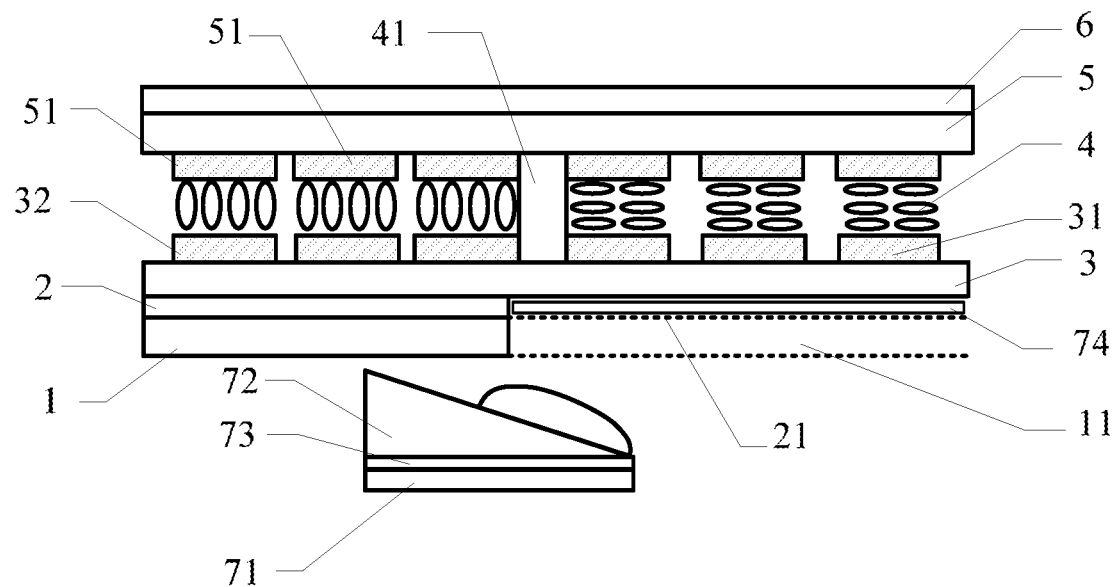
FIG. 3 is a first structural schematic diagrams illustrating a liquid-crystal display according to some embodiments.

In one embodiment, as shown in FIG. 3, a second light transmitting hole 21 corresponding to the first light transmitting hole 11 is formed in the inner polarizing layer 2 of the liquid-crystal display. In some embodiments, the second light transmitting hole 21 is formed by opening a through hole; or the second light transmitting hole 21 is formed by providing a transparent region having no polarization effect on the inner polarizing layer 2.

In such a case, when the light incident from the outside of the liquid-crystal display passes through the inner polarizing layer 2, it will not undergo the filtering effect of the inner polarizing layer 2 but directly pass through the second light transmitting hole 21, thereby further improving the light passing rate of the liquid-crystal display.

As an example, the second light transmitting hole 21 is disposed corresponding to the transparent region X, to ensure that the light incident on the liquid crystal layer 4 is polarized light and the normal display of the liquid-crystal display at the first light transmitting hole 11. In this example, optionally, a plurality of second light transmitting holes 21 is formed on the inner polarizing layer 2, and the second light transmitting holes 21 are distributed in a grid shape.

As another example, the second light transmitting hole 21 may be disposed beyond the transparent region X. At this time, optionally, the backlight member 7 includes an auxiliary polarizing layer 74. The auxiliary polarizing layer 74 replaces the polarization of the inner polarizing layer 2 at the second light transmitting hole 21, to ensure the normal display of the liquid-crystal display at the first light transmitting hole 11 when the second light transmitting hole 21 is disposed.

Figure 4:
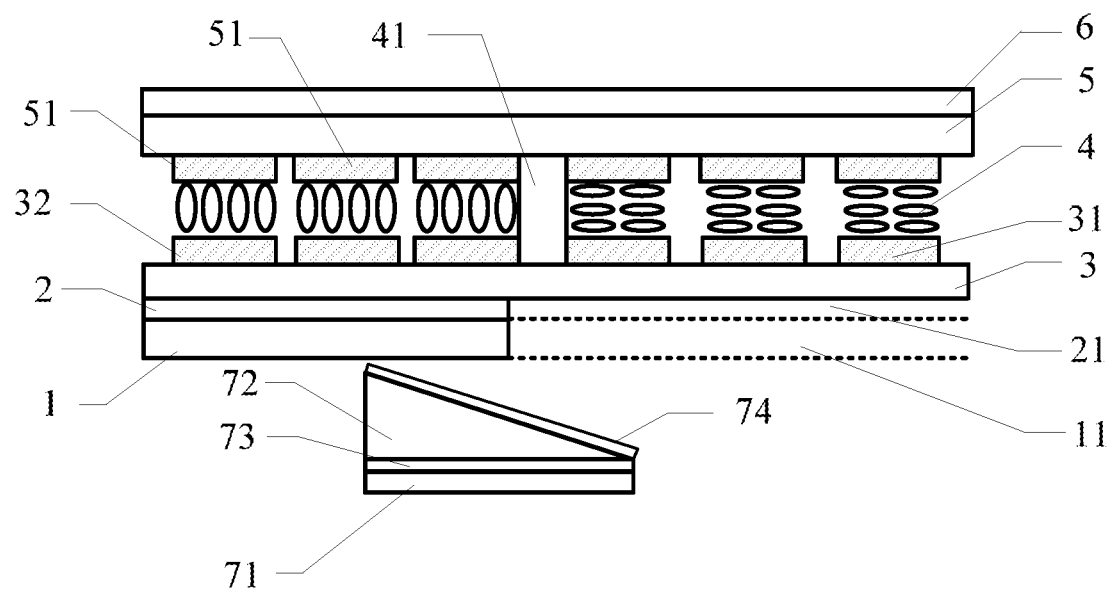
FIG. 4 is a second structural schematic diagrams illustrating a liquid-crystal display according to some embodiments.
Figure 5:
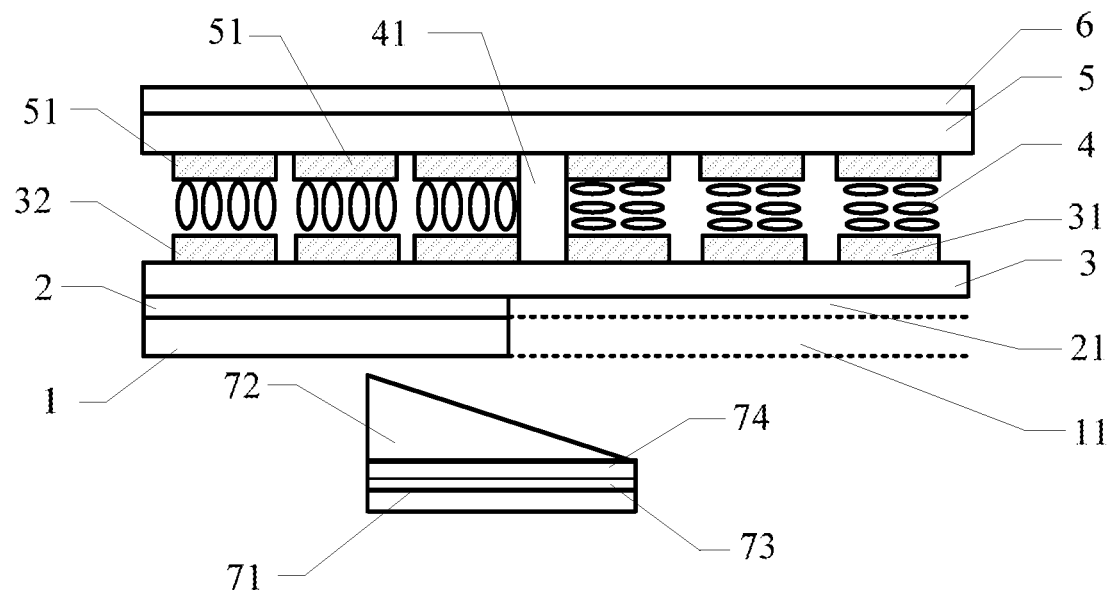
FIG. 5 is a third structural schematic diagrams illustrating a liquid-crystal display according to some embodiments.

In some embodiments, as shown in FIG. 3, the auxiliary polarizing layer 74 is disposed in the second light transmitting hole 21. Alternatively, as shown in FIG. 4, the auxiliary polarizing layer 74 is disposed on a side of the light gathering member 72 away from the light emitting element 71. Alternatively, as shown in FIG. 5, the auxiliary polarizing layer 74 is disposed on a side of the light gathering member 72 facing the light emitting element 71. It is to be noted that, preferably, the auxiliary polarizing layer 74 is provided on the light emitting side of the light guide member 73.

In one embodiment, in conjunction with FIG. 2, the liquid crystal layer 4 includes a transparent barrier 41. The transparent barrier 41 separates liquid crystals in the liquid crystal layer 4 corresponding to the first light transmitting hole 11 and liquid crystals in the liquid crystal layer 4 outside the light transmitting hole. It can be understood that the liquid crystal layer is divided into two regions by the transparent barrier 41, thus ensuring the stability of liquid crystals in the liquid crystal layer 4. Further, through the light transmittance of the transparent barrier member 41, no obvious boundary exists between the region corresponding to the first light transmitting hole 11 and the region outside the first light transmitting hole 11 in the liquid-crystal display, thus realizing smooth transition between the high pixel display region and the low pixel display region in the liquid-crystal display and optimizing the display effect.

In one embodiment, the liquid-crystal display further includes a liquid crystal driving circuit that drives the driving elements in the array substrate 3 to be turned on or off, thereby driving the liquid crystals to be rotated by the driving elements. Besides, the liquid-crystal display further includes a backlight driving circuit for driving the backlight member 7 to be turned on or off.

Further, the liquid crystal driving circuit of the liquid-crystal display 1 is connected to the display driving circuit of the backlight member, to transmit display signals. In other words, the liquid crystal driving circuit may communicate with the display driving circuit. Furthermore, the liquid crystal driving circuit and the display driving circuit may achieve that display contents of the region of the liquid-crystal display outside the first light transmitting hole 11 and the backlight member 7 synchronize, thereby optimizing the full screen display effect. For example, the region of the liquid-crystal display outside the first light transmitting hole 11 displays a preset app interface, and the region of the liquid-crystal display corresponding to the first light transmitting hole 11 displays an icon of the preset app.

Further, the liquid crystal driving element of the liquid-crystal display 1 is connected to the display driving element of the backlight member, to transmit display information. In other words, the liquid crystal driving element may communicate with the display driving element. Further, the liquid crystal driving element and the display driving element may achieve that display contents of the region of the liquid-crystal display corresponding to the first light transmitting hole 11 and the region outside the first light transmitting hole 11 synchronize, thereby optimizing the full screen display effect.

With respect to the positions of the backlight member 7 and the first light transmitting hole 11, there are following optional examples.

Figure 6:
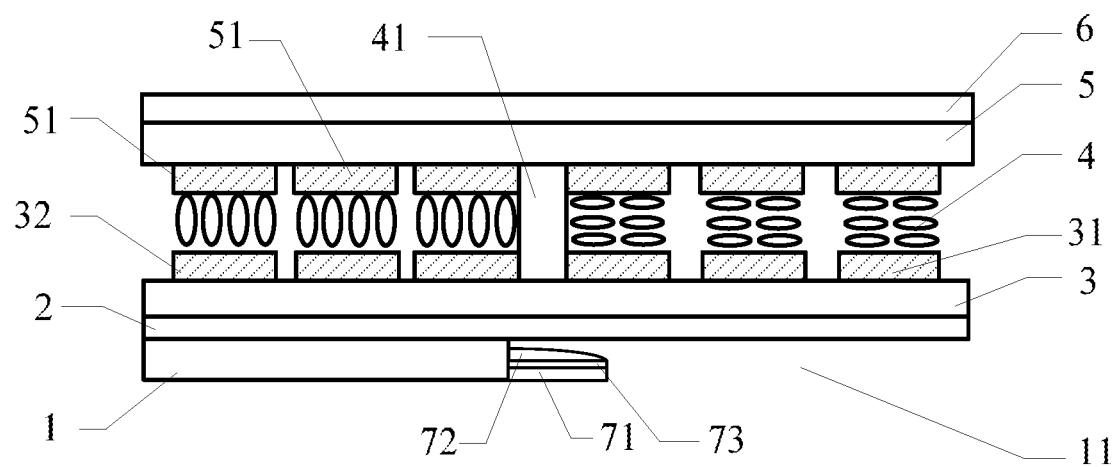
FIG. 6 is a fourth structural schematic diagrams illustrating a liquid-crystal display according to some embodiments.

As an example, as shown in FIG. 6, the first light transmitting hole 11 is formed by opening a hole and the light emitting element 71 and/or the light gathering member 72 are disposed in the first light transmitting hole 11 but their positions in the first light transmitting hole 11 are not particularly limited. For example, the light emitting element 71 and the light gathering member 72 are disposed at an edge of the first light transmitting hole 11. Alternatively, the light emitting element 71 and the light gathering member 72 are disposed in middle of the first light transmitting hole 11.

In the embodiment, the light emitting element 71 and/or the light gathering member 72 are optionally connected to a side wall of the first light transmitting hole 11, to facilitate the installation and fixation. For example, they are connected to the first light transmitting hole 11 through interference fit or by an adhesive. Such connection manners facilitate installation of the light gathering member 72.

Further, In some embodiments, a gap is provided between the light emitting element 71 and the light gathering member 72; or the light-emitting surface of the light emitting element 71 is covered with the light gathering member 72.

As an example, the light emitting element 71 and the light gathering member 72 are disposed under the liquid-crystal display in a region surrounding the first light transmitting hole 11.

Figure 7:
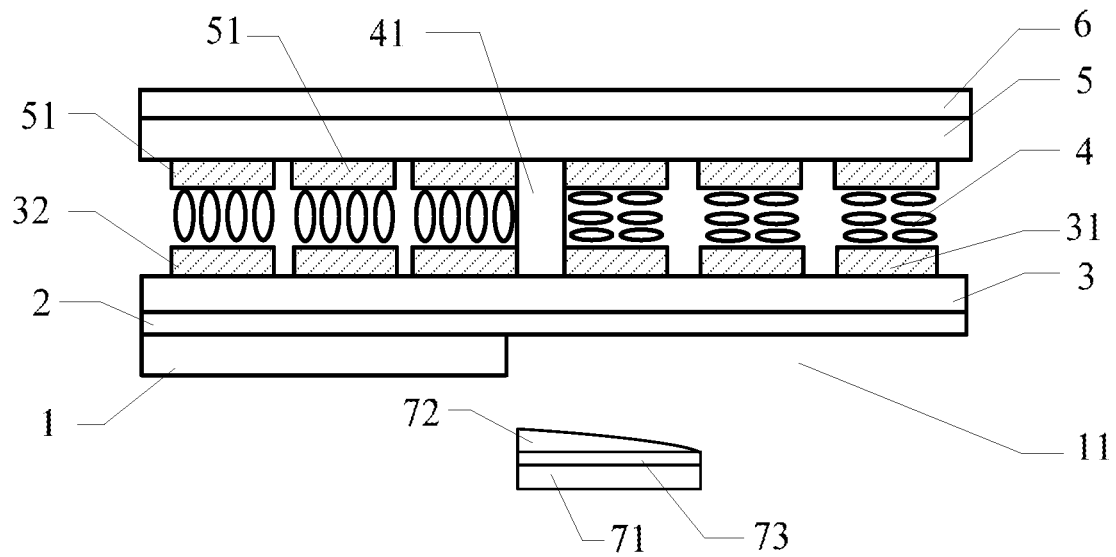
FIG. 7 is a fifth structural schematic diagrams illustrating a liquid-crystal display according to some embodiments.

For example, as shown in FIG. 7, the backlight member 7 is located below the liquid-crystal display and is disposed corresponding to light transmitting hole 8. In some embodiments, the backlight member 7 and/or the light gathering member 72 are connected to a bottom surface of the backlight layer 3 of the display screen.

In the embodiment, the light gathering member 72 is optionally disposed on the light emitting element 71. With this manner, light emitted from the light emitting element 71 ejects out after passing through the light gathering member 72 and a gathering effect of the light gathering member 72 is fully achieved. For example, the light gathering member 72 is attached to the light emitting element 71 by an adhesive, which can optionally be a transparent material to ensure the light-transmitting property of the light gathering member 72.

Of course, the light gathering member 72 is optionally connected to the side wall of the first light transmitting hole 11, and is located in the first light transmitting hole 11 and the light emitting element 71 is disposed under the liquid-crystal display. The installation positions and manners of the light emitting element 71 and the light gathering member 72 relative to the first light transmitting hole 11 can be selected according to actual needs.

Alternatively, for example, as shown in FIG. 1, the backlight member 7 is disposed in a region surrounding the first light transmitting hole 11 below the liquid-crystal display. Alternatively, the light emitting element 71 and the light gathering member 72 include a portion corresponding to the light transmitting hole 8 and a portion laterally beyond the light transmitting hole 8. Moreover, the light emitting element 71 and the light gathering member 72 are optionally disposed around a preset region which is used to provide a lens.

In addition, in one embodiment, the backlight layer 1 includes a light guide plate used for uniform light source illumination, so that when the first light transmitting hole 11 is formed, the first light transmitting hole 11 penetrates the light guide plate. Therefore, there may be a case where light in the light guide plate enters the first light transmitting hole 11, which may affect the display effect of the backlight member 7.

Therefore, the liquid-crystal display optionally further includes a light shielding member disposed on a side wall of the first light transmitting hole 11 (when the first light transmitting hole 11 is formed by opening a hole, the light shielding member is disposed on the side wall of the first light transmitting hole 11). The light shielding member blocks light emitted from the backlight layer 1, so that the first light transmitting hole 11 only allows light emitted from the backlight member 7 to pass through, to ensure the display effect of the first light transmitting hole 11.

What needs to be emphasized is that in the embodiment of the present disclosure, in addition to a lens and an image acquisition module, the liquid-crystal display and other optical function modules can be assembled. By the liquid-crystal display provided by the embodiment of the present disclosure, both the light-transmittance property and the full screen display effect are realized and user experience is improved.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Figure 8:
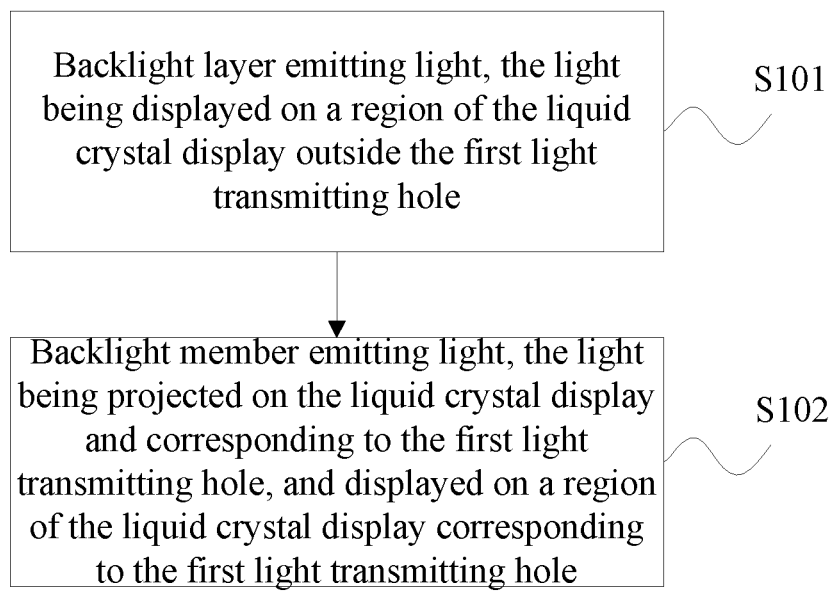
FIG. 8 is a first flowchart illustrating a display method according to some embodiments.

According to a second aspect, an embodiment of the present disclosure provides a display method, which is applied to the liquid-crystal display according to the first aspect above-described. As shown in FIG. 8, the method includes following steps.

In step S101, the backlight layer emits light to display in a region of the liquid-crystal display outside the first light transmitting hole.

Specifically, the backlight layer emits light and the liquid crystal driving element in the array substrate drives the liquid crystals to be rotated to adjust and control luminous flux of light exited out of the outer polarizing layer, so that the image display of the liquid-crystal display not corresponding to the first light transmitting hole is achieved in cooperation with the filter layer.

In step S102, the backlight member emits light, the light is projected on the liquid-crystal display and corresponding to the first light transmitting hole, and displayed on a region of the liquid-crystal display corresponding to the first light transmitting hole.

Specifically, the backlight member provides a backlight source. The liquid crystals of the liquid crystal layer in the liquid-crystal display corresponding to the first light transmitting hole are rotated to a light-transmitting state and the polarization angle of light emitted from the backlight member is changed, so that the light penetrates the outer polarizing layer. Therefore, the display at the first light transmitting hole of the liquid-crystal display is realized.

In the embodiment, an image with less dynamic change, such as a power icon, a signal icon, etc., may be displayed on the region of the liquid-crystal display corresponding to the first light transmitting hole.

In addition, the liquid crystal driving circuit of the liquid-crystal display communicates with the backlight driving circuit of the backlight member, and transmits display information. The display content of the region of the liquid-crystal display outside the first light transmitting hole and the display content of the region of the liquid-crystal display corresponding to the first light transmitting hole synchronize. Therefore, the full screen display effect may be achieved and the user experience is optimized.

It should be noted that when the liquid-crystal display and the image acquisition module are assembled and both the backlight member and the backlight layer emit light, the image acquisition module is turned off. Moreover, the above steps are merely for convenience of descriptions and do not limit the orders in actual operations. Therefore, steps S101 and S102 can be optionally performed at the same time, or step S102 is performed before step S201.

Figure 9:
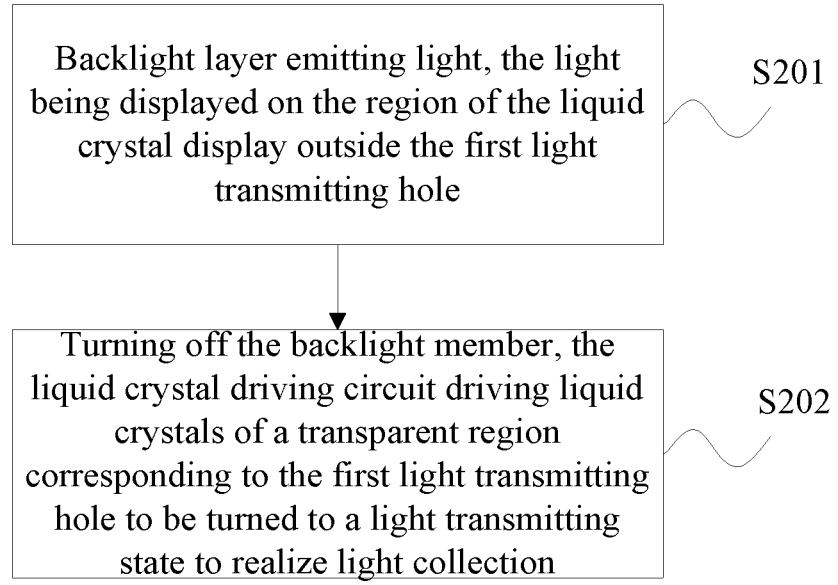
FIG. 9 is a second flowchart illustrating a display method according to some embodiments.
Figure 10:
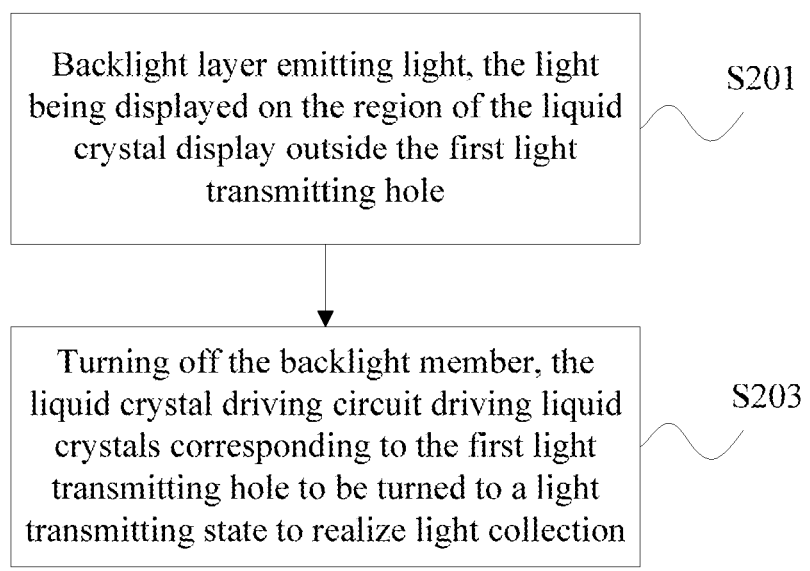
FIG. 10 is a third flowchart illustrating a display method according to some embodiments.

In an embodiment, as shown in FIGS. 9 and 10, the method further includes S201 and S202.

In step S201, a backlight layer emits light to display at a region of a liquid-crystal display outside the first light transmitting hole. At this time, a liquid crystal driving element drives liquid crystals of the region outside the first light transmitting hole to be rotated, so that the image display of the region outside the first light transmitting hole in the liquid-crystal display is realized.

In some embodiments, as shown in FIG. 9, after the step S201, the method further includes Step S202.

Step S202: the backlight member is turned off; the liquid crystal driving circuit drives liquid crystals of a transparent region corresponding to the first light transmitting hole to be turned to a light transmitting state to realize light collection. At this time, the portion of the transparent region in the liquid-crystal display corresponding to the first light transmitting hole is in a light transmitting state, and the light passes.

Alternatively, as shown in FIG. 10, after the step S201, the method further includes Step S203.

Step S203: the backlight is turned off; the liquid crystal driving circuit drives liquid crystals corresponding to the first light transmitting hole to be turned to a light transmitting state to realize light collection. At this time, the portion of the liquid-crystal display corresponding to the first light transmitting hole is in a light transmitting state, and the light passes.

This method can be optionally applied to the situation where the liquid-crystal display and the lens are cooperated. At this time, the lens is disposed below the first light transmitting hole. When in use, the light outside the liquid-crystal display can penetrate a part or all of the region corresponding to the first light transmitting hole and then be received by the lens to realize light collection and image acquisition.

It should be noted that, in this method, optionally, the image acquisition module that cooperates with the lens compensates a portion of the first light transmitting hole 11 where the light cannot pass through, such as a pixel or a filter portion, by a preset algorithm, to acquire the complete image.

Figure 11:
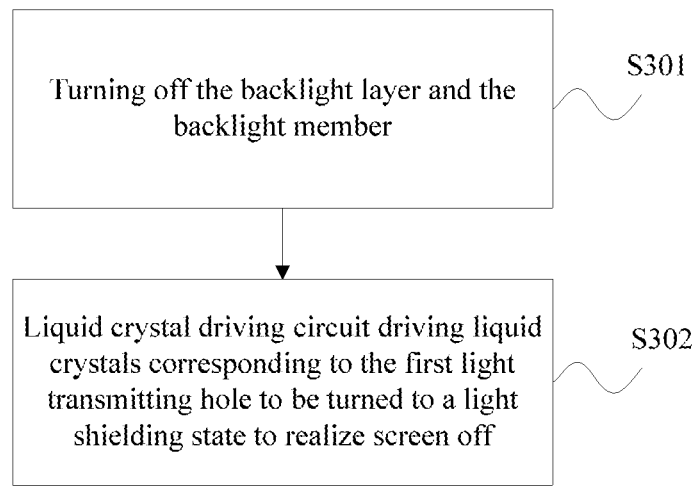
FIG. 11 is a fourth flowchart illustrating a display method according to some embodiments.

In an embodiment, as shown in FIG. 11, the method further includes S301 and S302.

In step S301, the backlight layer and the backlight member are turned off. At this time, the backlight layer no longer emits light and a region of the display screen that does not correspond to the first light transmitting hole is in a darkness state. A display driving element turns off the backlight member.

In step S302, a liquid crystal driving circuit drives liquid crystals corresponding to the first light transmitting hole to be turned to a light shielding state and screen off is achieved.

A light-transmittance of the liquid crystal layer corresponding to the first light transmitting hole is lowered by rotating the liquid crystal, so that a region of the liquid-crystal display corresponding to the first light transmitting hole is also in a darkness state.

This method is applied to the situation in which the liquid-crystal display is in a black screen state. A component or structure under the first light transmitting hole is shielded by rotating the liquid crystals corresponding to the first light transmitting hole in the liquid crystal layer to the light shielding state. Moreover, at this time, a region of the display screen corresponding to the first light transmitting hole tends to be in a darkness state and the difference between the display effect of the liquid-crystal display corresponding to the first light transmitting hole and the display effect of the liquid-crystal display outside the first light transmitting hole can also be mitigated, so the full screen effect will be optimized.

Figure 12:
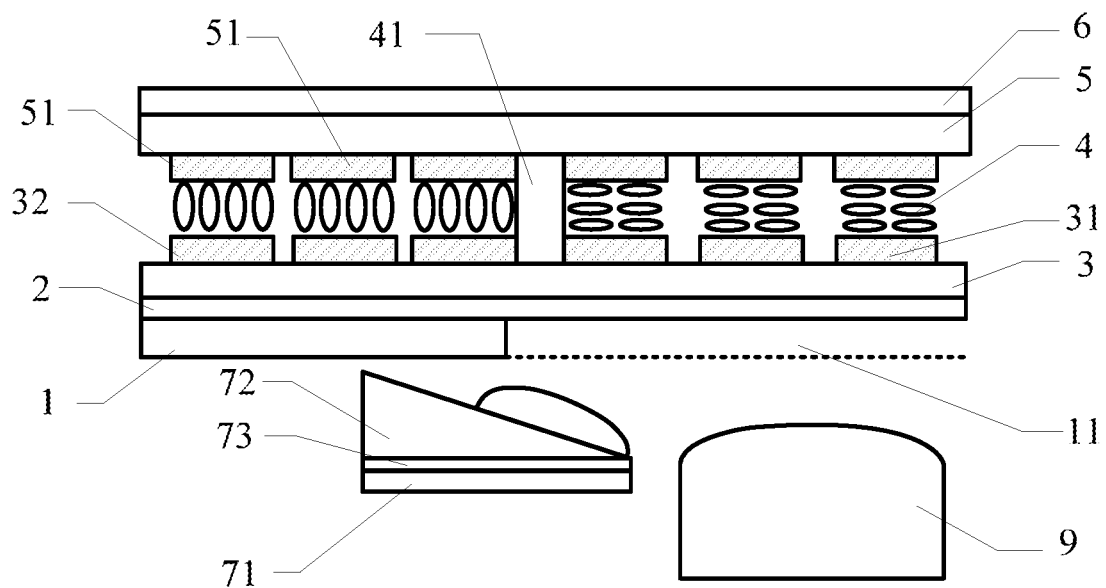
FIG. 12 is a first schematic diagram illustrating a terminal according to some embodiments.

According to a third aspect, an embodiment of the present disclosure provides a terminal. As shown in FIG. 12, the terminal includes a lens 9 and the above liquid-crystal display according to the first aspect. The lens 9 is disposed corresponding to the first light transmitting hole 11 in the liquid-crystal display and the backlight member 7 is disposed in a region surrounding the lens 9.

For example, the backlight member 7 is disposed on a side of the lens 9, or is disposed surrounding the lens 9. When the backlight member 7 is disposed surrounding the lens 9, a plurality of backlight member 7 is optionally employed and surrounds the lens 9. Alternatively, a separate backlight member 7 can be used optionally and a through hole corresponding to the first light transmitting hole 11 is disposed on the backlight member 7 and the lens 9 is inserted into the through hole.

In the example, the backlight member 7 and the lens 9 do not affect each other and both the full screen display of the liquid-crystal display and the image acquisition effect of the lens 9 can be achieved.

Figure 13:
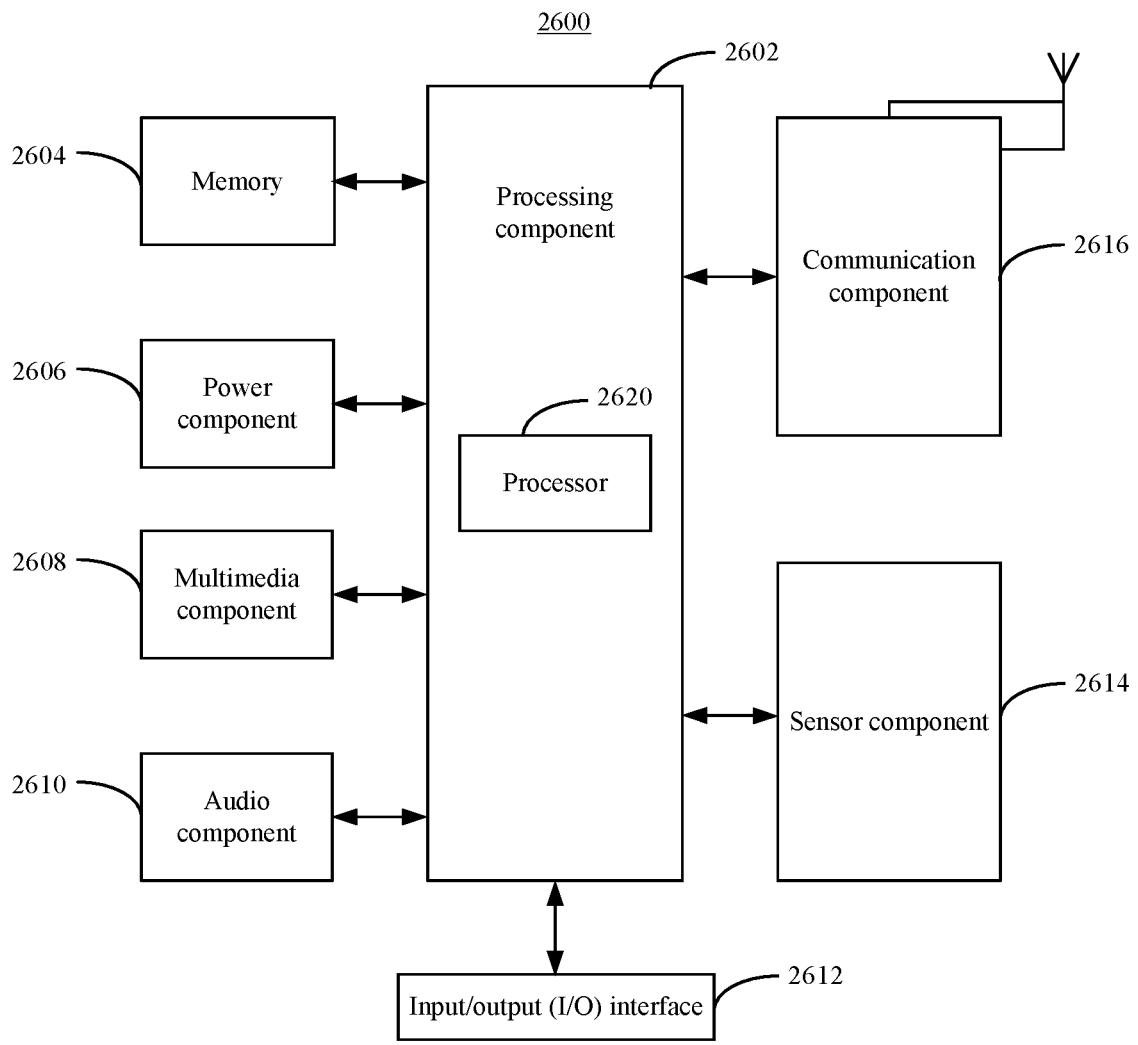
FIG. 13 is a second schematic diagram illustrating a terminal according to some embodiments.

FIG. 13 is a diagram illustrating a terminal 2600 according to an embodiment of the present disclosure. For example, the device 2600 may be a mobile phone, a computer, a digital broadcast terminal, a messaging device, a gaming console, a tablet, a medical device, exercise equipment, a personal digital assistant, and the like.

Referring to FIG. 13, the device 2600 may include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 may include one or more processors 2620 to execute instructions to perform all or part of the steps in the above described methods. Moreover, the processing component 2602 may include one or more modules which facilitate the interaction between the processing component 2602 and other components. For instance, the processing component 2602 may include a multimedia module to facilitate the interaction between the multimedia component 2608 and the processing component 2602.

The memory 2604 is configured to store various types of data to support the operation of the device 2600. Examples of such data include instructions for any applications or methods operated on the device 2600, contact data, phonebook data, messages, pictures, video, etc. The memory 2604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2606 provides power to various components of the device 2600. The power component 2606 may include a power management system, one or more power sources, and any other components associated with the generation, management, and distribution of power in the device 2600.

The multimedia component 2608 includes a screen providing an output interface between the device 2600 and the user. In some embodiments, the screen may include a liquid-crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2608 includes a front camera and/or a rear camera. The front camera and/or the rear camera may receive an external multimedia datum while the device 2600 is in an operation mode, such as a photographing mode or a video mode. Each of the front camera and the rear camera may be a fixed optical lens system or have focus and optical zoom capability.

The audio component 2610 is configured to output and/or input audio signals. For example, the audio component 2610 includes a microphone ("MIC") configured to receive an external audio signal when the device 2600 is in an operation mode, such as a call mode, a recording mode, and a voice recognition mode. The received audio signal may be further stored in the memory 2604 or transmitted via the communication component 2616. In some embodiments, the audio component 2610 further includes a speaker to output audio signals.

The I/O interface 2612 provides an interface between the processing component 2602 and peripheral interface modules, such as a keyboard, a click wheel, buttons, and the like. The buttons may include, but are not limited to, a home button, a volume button, a starting button, and a locking button.

The sensor component 2614 includes one or more sensors to provide status assessments of various aspects of the device 2600. For instance, the sensor component 2614 may detect an open/closed status of the device 2600, relative positioning of components, e.g., the display and the keypad, of the device 2600, a change in position of the device 2600 or a component of the device 2600, a presence or absence of user contact with the device 2600, an orientation or an acceleration/deceleration of the device 2600, and a change in temperature of the device 2600. The sensor component 2614 may include a proximity sensor configured to detect the presence of nearby objects without any physical contact. The sensor component 2614 may also include a light sensor, such as a CMOS or CCD image sensor, for use in imaging applications. In some embodiments, the sensor component 2614 may also include an accelerometer sensor, a gyroscope sensor, a magnetic sensor, a pressure sensor, or a temperature sensor.

The communication component 2616 is configured to facilitate communication, wired or wirelessly, between the device 2600 and other devices. The device 2600 can access a wireless network based on a communication standard, such as Wi-Fi, 2G, 3G, 4G, or 5G, or a combination thereof. In one exemplary embodiment, the communication component 2616 receives a broadcast signal or broadcast associated information from an external broadcast management system via a broadcast channel. In one exemplary embodiment, the communication component 2616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 2600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 2604, executable by the processor 2620 in the device 2600, for performing the above-described methods. For example, the non-transitory computer-readable storage medium may be a ROM, a RAM, a CD-ROM, a magnetic tape, a floppy disc, an optical data storage device, and the like.

Various embodiments of the present disclosure can have one or more of the following advantages.

In the liquid-crystal display provided by the embodiments of the present disclosure, an image is normally displayed in a portion of the liquid-crystal display outside the first light transmitting hole; and an image is displayed in a portion of the liquid-crystal display corresponding to first light transmitting hole by means of a backlight member, so that a full screen display effect of the liquid-crystal display is realized. Moreover, a pixel of the liquid-crystal display corresponding to the first light transmitting hole is lower than a pixel of the liquid-crystal display outside the first light transmitting hole. Accordingly, a light transmittance of the liquid-crystal display corresponding to the first light transmitting hole is improved, thereby realizing an image acquisition function of a camera under the screen. When the liquid-crystal display is matched with the lens, the lens is placed under the first light transmitting hole, such that the lens receives the light that penetrates the first light transmitting hole, thus realizing the image acquisition function. The image acquisition effect of the lens is improved by improving the light transmittance of a region corresponding to the first light transmitting hole. The liquid-crystal display provided by the embodiments of the present disclosure can therefore take into account both the full screen display effect and the image acquisition function.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In an apparatus having the display, other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A liquid-crystal display comprising:
   a backlight layer, formed with a first light transmitting hole; and
   a backlight member, disposed at the first light transmitting hole, wherein the backlight member is configured to emit light to be projected on a region of the liquid-crystal display corresponding to the first light transmitting hole,
   wherein a pixel density of the region of the liquid-crystal display corresponding to the first light transmitting hole is lower than that of a region of the liquid-crystal display outside the first light transmitting hole; and
   wherein the backlight member comprises a light gathering member disposed at an edge of the first light transmitting hole.

2. The liquid-crystal display according to claim 1, wherein in the region corresponding to the first light transmitting hole, a transparent region exists between adjacent pixels.

3. The liquid-crystal display according to claim 2, wherein an array substrate of the liquid-crystal display comprises transparent wirings disposed corresponding to the transparent region; or
   a filter layer of the liquid-crystal display comprises a transparent portion disposed corresponding to the transparent region.

4. The liquid-crystal display according to claim 1, wherein the backlight member further comprises:
   a light emitting element,
   wherein the light gathering member is located on a light emitting side of the light emitting element and is disposed to uniformly project light emitted by the light emitting element onto the liquid-crystal display and to correspond to the first light transmitting hole.

5. The liquid-crystal display according to claim 4, wherein the backlight member further comprises: a light guide member disposed between the light emitting element and the light gathering member.

6. The liquid-crystal display according to claim 4, wherein the backlight member further comprises an auxiliary polarizing layer located on a light emitting side of the light emitting element,
   wherein the auxiliary polarizing layer is disposed in a second light transmitting hole, and the second light transmitting hole is a light transmitting hole corresponding to the first light transmitting hole and disposed in an inner polarizing layer of the liquid-crystal display; or
   the auxiliary polarizing layer is disposed on a side of the light gathering member away from the light emitting element; or
   the auxiliary polarizing layer is disposed on a side of the light gathering member facing the light emitting element.

7. The liquid-crystal display according to claim 1, wherein a density of driving elements of a region of an array substrate of the liquid-crystal display corresponding to the first light transmitting hole is lower than a density of driving elements of a region of the array substrate outside the light transmitting hole; or
   a density of filters of a region of a filter layer of the liquid-crystal display corresponding to the first light transmitting hole is lower than a density of filters of a region of the filter layer outside the light transmitting hole.

8. The liquid-crystal display according to claim 1, wherein the liquid-crystal display further comprises a liquid crystal driving circuit;
   a liquid crystal layer in the liquid-crystal display comprising a light transmitting state caused by control of the liquid crystal driving circuit.

9. The liquid-crystal display according to claim 8, wherein the liquid crystal layer further comprises a light shielding state caused by control of the liquid crystal driving circuit, and a light transmittance under the light shielding state is smaller than a light transmittance under the light transmitting state.

10. The liquid-crystal display according to claim 1, wherein the liquid crystal layer comprises a transparent barrier, the transparent barrier separates liquid crystals in the liquid crystal layer corresponding to the first light transmitting hole and liquid crystals in the liquid crystal layer outside the light transmitting hole.

11. The liquid-crystal display according to claim 1, wherein an inner polarizing layer of the liquid-crystal display is formed with a second light transmitting hole corresponding to the first light transmitting hole.

12. The liquid-crystal display according to claim 1, wherein the liquid-crystal display further comprises a backlight driving circuit, and the backlight driving circuit drives the backlight member to be turned on or off.

13. The liquid-crystal display according to claim 1, wherein the backlight member is located in a surrounding region of the first light transmitting hole below the backlight layer; or the backlight member is located within the first light transmitting hole.

14. A display method, applied to the liquid-crystal display according to claim 1, the method comprising:

the backlight layer emitting light, the light being displayed on a region of the liquid-crystal display outside the first light transmitting hole; and the backlight member emitting light, the light being projected on the liquid-crystal display and corresponding to the first light transmitting hole, and displayed on a region of the liquid-crystal display corresponding to the first light transmitting hole.

15. The method according to claim 14, wherein the backlight member emitting light comprises:

the light emitting element emitting light, and a liquid crystal driving circuit driving liquid crystals of a liquid crystal layer at the first light transmitting hole to be turned to a light transmitting state, and changing a polarization angle of the light emitted by the backlight member, such that the light penetrates an outer polarizing layer to achieve screen display.

16. The method according to claim 14, wherein the method further comprises:

the liquid crystal driving circuit of the liquid-crystal display communicating with a backlight driving circuit of the backlight member, a display content of a region of the liquid-crystal display outside the first light transmitting hole and a display content of a region of the liquid-crystal display corresponding to the first light transmitting hole synchronize.

17. The method according to claim 14, wherein the method further comprises:

the backlight layer emitting light, the light being displayed on the region of the liquid-crystal display outside the first light transmitting hole; and turning off the backlight member, the liquid crystal driving circuit driving liquid crystals of a transparent region corresponding to the first light transmitting hole to be turned to a light transmitting state to realize light collection; or the liquid crystal driving circuit driving liquid crystals corresponding to the first light transmitting hole to be turned to a light transmitting state to realize light collection.

18. The method according to claim 14, wherein the method further comprises:

turning off the backlight layer and the backlight member, and the liquid crystal driving circuit driving liquid crystals corresponding to the first light transmitting hole to be turned to a light shielding state to realize screen off.

19. A terminal, comprising: a lens, and a liquid-crystal display, the liquid-crystal display comprising: a backlight layer, formed with a first light transmitting hole; a backlight member, disposed at the first light transmitting hole, wherein the backlight member emits light and the light is projected on a region of the liquid-crystal display corresponding to the first light transmitting hole, wherein a pixel density of the region of the liquid-crystal display corresponding to the first light transmitting hole is lower than that of a region of the liquid-crystal display outside the first light transmitting hole, and wherein the backlight member further comprises a light gathering member disposed at an edge of the first light transmitting hole, and wherein the lens is disposed corresponding to a first light transmitting hole in the liquid-crystal display, and the backlight member is disposed in a surrounding region of the lens.

20. The terminal according to claim 19, wherein the backlight member is disposed around the lens; or the backlight member is disposed on one side of the lens; or the backlight member is formed with a hollow region corresponding to the first light transmitting hole, and the lens is inserted into the hollow region.

\* \* \* \* \*